US012509936B2

(12) United States Patent
Patel et al.

(10) Patent No.: US 12,509,936 B2
(45) Date of Patent: Dec. 30, 2025

(54) HYBRID DRIVE-THRU AUTOMATIC TOUCHLESS DOOR SYSTEM

(71) Applicant: Allegion Access Technologies LLC, Carmel, IN (US)

(72) Inventors: Vinay Patel, Rocky Hill, CT (US); Christopher Kolodziej, Kensington, CT (US); Larry Hamaker, Marietta, GA (US); David Dillon, Arlington Heights, IL (US)

(73) Assignee: Allegion Access Technologies LLC, Carmel, IN (US)

( * ) Notice: Subject to any disclaimer, the term of this patent is extended or adjusted under 35 U.S.C. 154(b) by 0 days.

(21) Appl. No.: 17/946,435

(22) Filed: Sep. 16, 2022

(65) Prior Publication Data

US 2023/0067739 A1 Mar. 2, 2023

Related U.S. Application Data

(60) Provisional application No. 63/239,189, filed on Aug. 31, 2021.

(51) Int. Cl.
*E06B 3/48* (2006.01)
*E05D 15/06* (2006.01)
(Continued)

(52) U.S. Cl.
CPC .............. *E06B 5/00* (2013.01); *E05D 15/063* (2013.01); *E05D 15/0652* (2013.01);
(Continued)

(58) Field of Classification Search
CPC ....... E06B 5/00; E06B 3/487; E05F 2017/007
See application file for complete search history.

(56) References Cited

U.S. PATENT DOCUMENTS 484,235 A * 10/1892 Plunkett .................. E05C 19/14
292/DIG. 20
1,569,602 A 1/1926 Anderson
(Continued)

FOREIGN PATENT DOCUMENTS

CA 2761997 C 3/2019
CN 213928055 U * 8/2021
(Continued)

OTHER PUBLICATIONS

International Search Report; International Searching Authority; International Patent Application No. PCT/US2022/043784; Jan. 11, 2023; 2 pages.

(Continued)

*Primary Examiner* — Marcus Menezes
(74) *Attorney, Agent, or Firm* — Taft Stettinius & Hollister LLP

(57) ABSTRACT

A hybrid drive-thru door system that includes a door panel assembly movable between a plurality of operating modes. The door panel assembly includes a sliding door panel operable for movement between a closed position to at least partially cover a doorway opening and an opened position to at least partially expose the doorway opening. The sliding door panel has an upper sliding door panel member releasably attached to a lower sliding door panel member. The upper sliding door panel member is independently movable relative to the lower sliding door panel member in a window operating mode of the door panel assembly.

20 Claims, 14 Drawing Sheets

(51) Int. Cl.
*E06B 3/46* (2006.01)
*E06B 5/00* (2006.01)

(52) U.S. Cl.
CPC ..... *E05D 15/0665* (2013.01); *E05D 15/0686* (2013.01); *E06B 3/4636* (2013.01); *E05Y 2201/22* (2013.01); *E05Y 2201/684* (2013.01); *E05Y 2201/688* (2013.01); *E05Y 2800/102* (2013.01); *E05Y 2800/205* (2013.01); *E05Y 2900/132* (2013.01); *E05Y 2900/148* (2013.01)

(56) References Cited

U.S. PATENT DOCUMENTS

| | | | | | |
|---|---|---|---|---|---|
| 1,633,375 | A * | 6/1927 | Dudley | E06B 3/34 | 49/142 |
| 2,638,190 | A * | 5/1953 | Watkins | E06B 3/4618 | 49/458 |
| 3,397,487 | A * | 8/1968 | Hunt | E06B 3/924 | 49/420 |
| 4,164,095 | A * | 8/1979 | Musacchia | E06B 5/00 | 49/141 |
| 5,908,064 | A * | 6/1999 | Bruce | A47K 3/362 | 160/202 |
| 6,612,358 | B2 | 9/2003 | Hay et al. | | |
| 6,973,753 | B2 | 12/2005 | Liebscher | | |
| 7,992,355 | B2 | 8/2011 | Bridgman et al. | | |
| 8,205,387 | B2 | 6/2012 | Ranaudo et al. | | |
| 8,443,549 | B2 * | 5/2013 | Salvietti | E05F 15/646 | 49/141 |
| 8,627,604 | B2 * | 1/2014 | Seymour | E06B 3/922 | 49/141 |
| 8,826,598 | B2 | 9/2014 | Ranaudo et al. | | |
| 9,458,654 | B2 | 10/2016 | Palsson et al. | | |
| 9,637,970 | B1 | 5/2017 | Rendon, Jr. et al. | | |
| 9,903,148 | B2 | 2/2018 | Rodems et al. | | |
| 10,113,347 | B2 | 10/2018 | Wolfe | | |
| RE47,380 | E | 5/2019 | Bridgman et al. | | |
| 10,280,678 | B1 | 5/2019 | Rendon, Jr. et al. | | |
| 10,513,876 | B2 | 12/2019 | Molloy et al. | | |
| 10,577,848 | B2 | 3/2020 | Rodems et al. | | |
| 10,718,150 | B2 | 7/2020 | Hall et al. | | |
| 10,808,446 | B2 | 10/2020 | Hall et al. | | |
| 10,890,016 | B2 | 1/2021 | Brewer | | |
| 10,920,477 | B2 | 2/2021 | Akgor et al. | | |
| 10,995,537 | B2 | 5/2021 | Hall et al. | | |
| 10,995,538 | B2 | 5/2021 | Hall et al. | | |
| 11,168,508 | B2 | 11/2021 | Dreyer | | |
| 11,274,490 | B2 | 3/2022 | Goldfinch et al. | | |
| 11,401,735 | B2 * | 8/2022 | Schonberger | E05B 63/18 | |
| 11,448,003 | B2 | 9/2022 | Wolfe et al. | | |
| 11,492,832 | B2 | 11/2022 | Hernandez | | |
| 11,555,344 | B2 | 1/2023 | Patel et al. | | |
| 2008/0092445 | A1 | 4/2008 | Ramirez | | |
| 2012/0117881 | A1 | 5/2012 | Seymour et al. | | |
| 2012/0247024 | A1 * | 10/2012 | Therrien | E05D 15/0621 | 49/506 |
| 2013/0042534 | A1 * | 2/2013 | Polus | E05D 15/0673 | 49/425 |
| 2013/0097935 | A1 * | 4/2013 | Sprague | E05D 15/0665 | 49/506 |
| 2019/0309561 | A1 | 10/2019 | Hall et al. | | |
| 2021/0032905 | A1 | 2/2021 | Zhang et al. | | |
| 2022/0098926 | A1 | 3/2022 | Comaglio | | |
| 2022/0136303 | A1 | 5/2022 | Martin et al. | | |
| 2022/0235593 | A1 | 7/2022 | Bai | | |
| 2023/0061488 | A1 * | 3/2023 | Wolfe | E06B 3/481 | |
| 2023/0086262 | A1 | 3/2023 | Erskine et al. | | |
| 2023/0088843 | A1 | 3/2023 | Oakes et al. | | |
| 2023/0110893 | A1 | 4/2023 | Stabile | | |
| 2023/0167670 | A1 * | 6/2023 | Joossen | E06B 3/4609 | 49/425 |

FOREIGN PATENT DOCUMENTS

| | | | | | |
|---|---|---|---|---|---|
| EP | 2565356 | A1 * | 3/2013 | E05D 15/08 |
| WO | WO-2015018608 | A1 * | 2/2015 | E05F 17/00 |

OTHER PUBLICATIONS

Written Opinion; International Searching Authority; International Patent Application No. PCT/US2022/043784; Jan. 11, 2023; 8 pages.

Canadian Examination Report; Canadian Intellectual Property Office; Canadian Application No. 3,230,525; Jul. 17, 2025; 10 pages.

Pocket Door Dutch Door; Dutch Door Pocket Door Kit; Hanging Door Hardware; Woodward's Hardware; 8 pages; retrieved from <https://hangingdoorhardware.com/pocketdoors/dutch_door_pocket_door.html>, as archived by The Internet Archive on Mar. 8, 2021.

* cited by examiner

HYBRID DRIVE-THRU AUTOMATIC TOUCHLESS DOOR SYSTEM

The present application claims the benefit of the filing date of U.S. Provisional Application Ser. No. 63/239,189 filed on Aug. 31, 2021, which is incorporated herein by reference.

TECHNICAL FIELD

One or more embodiments of the present disclosure relate generally to automatic touchless door systems that are operable to provide the functionality of a drive-thru window and a fully automatic touchless door.

BACKGROUND

Door systems having automatic door operators are frequently used for providing automatic opening and closing of one or more movable door members in order to facilitate ingress and egress. Some systems include door members that are swing doors that move about a pivot axis. Some door systems include sliding door members or revolving door members.

Many fast-food restaurants are seeing a rise in drive-thru service. This is likely due to the initiative to make all things as touchless as possible during and after the COVID pandemic. Currently, restaurants may use one or more standard drive thru service windows to service customers in one or more lanes. The customers are instructed to park in designated parking areas ("car-hop") during rush hours to avoid long lines in the drive thru queue. Employees will then bring their orders directly to the customer's vehicle. Problems occur when employees need to walk through the restaurant from the kitchen and then to the customer's parking place. This inefficiency wastes valuable time during rush hour when customers still expect fast service. By allowing the employees the ability to walk out directly from the kitchen to the lot, they can get food to customers much faster and with less risk of dropping the food along the way due to the shorter walking distance.

Door products currently in the market typically only perform one function. Drive-thru windows are very common, but they do not provide full-door functionality. Automatic doors are also common without top sliding window functionality in the manner that a drive-thru window does. There are limited current solutions in the market, and these limited solutions offer limited functionality in one door package. Such solutions characteristically use surface-mounted linear drawing slides that are difficult to clean or sanitize due to the presence of particles, debris, germs, etc. Moreover, the presence of particles and debris that are captured on the linear slides reduces the overall performance of the doors. In addition, the structural configuration of linear drawing slides are more sensitive to tolerances and do not allow for vertical adjustment or vertical movement. The linear drawer slides are prone to binding caused from misalignment.

SUMMARY

In accordance with one or more embodiments of the present disclosure, a hybrid drive-thru automatic touchless door system is provided which has great operational flexibility and provides a multi-mode functionality. Such a hybrid drive-thru automatic touchless door system has a configuration that includes a flexible, changeable door that is operable for use between different operational modes, namely, a drive-thru window service mode and a full-door service mode. Such a hybrid drive-thru automatic touchless door system serves to eliminate the requirement for a separate drive-thru and a separate door entrance. The hybrid drive-thru automatic touchless door system is completely touchless but can allow for manual use in the event of power failure.

The hybrid drive-thru automatic touchless door system includes a pair of sliding door panels, each sliding door panel being bifurcated horizontally to form an upper panel member and a lower panel member. The bifurcated configuration of the sliding door panels facilitates operation of the hybrid drive-thru automatic touchless door system between a window operating mode in which the upper panel members are independently moveable relative to the lower panel members, and a door operating mode in which the upper panel members and the lower panel members are interlocked to move jointly together.

A guide system is provided for facilitating movement of the sliding door panels. The components of the guide system are concealed and captured within the structure of the door panels. Such concealment feature provides a cleaner design, is easier to clean, and is less likely to entrap undesirable particles such as dirt and debris. The guide system can also allow for vertical adjustment and is more forgiving to any type of misalignment.

In accordance with one or more embodiments, a hybrid drive-thru automatic touchless door system has a structural configuration that provides multi-mode functionality.

In accordance with one or more embodiments, a hybrid drive-thru automatic touchless door system has a structural configuration that provides simplified automation of a manual door system.

In accordance with one or more embodiments, a hybrid drive-thru automatic touchless door system has a structural configuration that provides the ability to increase efficiency and fast-food through-put, for fast-food restaurants having a drive-thru design that comprises one or more dual drive-thru lanes.

In accordance with one or more embodiments, an example entrance system may comprise one or more of the following: an operator; a gearmotor; a control module; a power source; and a sensor module having one or more sensors.

In accordance with one or more embodiments, an example entrance system may comprise one or more of the following: an operator; a motor; a control module; a power source; and an activation sensor module having one or more activation sensors.

In accordance with one or more embodiments, an example method of operating a hybrid drive-thru automatic touchless door system that includes a door member operable between manual operating mode and an automated operating mode; an automatic door operator having a motor operable to cause movement of the door member, the method comprising one or more of the following: automatically determining, in the automated operating mode, at least one condition; and then causing an action in response to the determined at least one condition.

In accordance with one or more embodiments, an example hybrid drive-thru automatic touchless door system may comprise one or more of the following: a door member operable between manual operating mode and an automated operating mode; an automatic door operator having a motor operable to cause movement of the door member; a controller operable to control the motor in response a manner such that in the automated operating mode, automatically determines at least one condition, and then causes an action in response to the determined at least one condition.

In accordance with one or more embodiments, an example drive-thru door system may comprise one or more of the following: a door panel assembly configured for mounting at a frame defining a doorway opening, the door panel assembly including a stationary door panel and a sliding door panel operable for automatic movement between a closed position to at least partially cover the doorway opening and an open position to at least partially expose the doorway opening, the sliding door panel having an upper sliding door panel member releasably attached to a lower sliding door panel member in a manner that facilitates selective placement of the sliding door panel between a window operating mode and a door operating mode to permit user general ingress and egress (not emergency egress) through the doorway opening; and a guide system operable to jointly move the upper sliding door panel member and the lower sliding door panel member relative to the frame in the door operating mode, and independently move the upper sliding door panel member relative to the lower sliding door panel member in the window operating mode.

In accordance with one or more embodiments, the guide system comprises at least one lower guide roller assembly arranged at a lower region of the lower sliding door panel member to facilitate movement of the lower sliding door panel member in the door operating mode, at least one intermediate guide roller assembly arranged at an upper region of the lower sliding door panel member to facilitate movement of the lower sliding door panel member in the door operating mode, and at least one upper guide roller assembly arranged at a lower region of the upper sliding door panel member to facilitate movement of the upper sliding door panel member in the door operating mode and the window operating mode.

In accordance with one or more embodiments, an example drive-thru door system may comprise one or more of the following: a door panel assembly configured for mounting at a frame defining a doorway opening, the door panel assembly, the door panel assembly including a stationary door panel and a sliding door panel operable for movement between a closed position to at least partially cover the doorway opening and an opened position to at least partially expose the doorway opening, the sliding door panel having an upper sliding door panel member releasably attached to a lower sliding door panel member; and a guide system operable to facilitate joint movement of the upper sliding door panel member and the lower sliding door panel member in a door operating mode to permit user ingress and egress through the doorway opening, and independent movement of the upper sliding door panel member relative to the lower sliding door panel member in a window operating mode of the sliding door panel. The guide system includes: at least one lower guide roller assembly arranged at a lower region of the lower sliding door panel member to facilitate movement of the lower sliding door panel member in the door operating mode, at least one intermediate guide roller assembly arranged at an upper region of the lower sliding door panel member to facilitate movement of the lower sliding door panel member in the door operating mode, and at least one upper guide roller assembly arranged at a lower region of the upper sliding door panel member to facilitate movement of the upper sliding door panel member in the door operating mode and the window operating mode.

In accordance with one or more embodiments, an example drive-thru door system may comprise one or more of the following: a door panel assembly configured for mounting at a frame defining a doorway opening, the door panel assembly including a stationary second door panel and a sliding door panel operable for movement between a closed position to at least partially cover the doorway opening and an opened position to at least partially expose the doorway opening, the sliding door panel having an upper sliding door panel member releasably attached to a lower sliding door panel member; and a guide system including a plurality of guide roller assemblies to facilitate joint movement of the upper sliding door panel member and the lower sliding door panel member in a door operating mode to permit user ingress and egress through the doorway opening, and independent movement of the upper sliding door panel member relative to the lower sliding door panel member in a window operating mode of the second door panel.

In accordance with an example embodiment of the hybrid drive-thru door system, the guide system further includes a first guide track having spaced apart guide channels extending in parallel.

In accordance with an example embodiment of the hybrid drive-thru door system, the at least one lower guide roller assembly is configured to engage the first guide track and facilitates movement of the lower sliding door panel member along the first guide track in the door operating mode.

In accordance with an example embodiment of the hybrid drive-thru door system, the at least one lower guide roller assembly is arranged in a concealed position in the lower sliding door panel member and comprises: a guide body having a pair of spaced apart guide legs configured to be movably received in the guide channels to laterally stabilize the lower first door panel member on the first guide track.

In accordance with an example embodiment of the hybrid drive-thru door system, the at least one lower guide roller assembly further comprises one or more first guide wheel members connected to the guide body for rotation on the first guide track.

In accordance with an example embodiment of the hybrid drive-thru door system, the at least one lower guide roller assembly further comprises a bias member mounted on a guide shaft operable to apply a bias force to the guide body in a manner that facilitates vertical adjustment of the lower sliding door panel member during movement of the lower sliding door panel member along the first guide track while also maintaining the guide legs in the guide channels.

In accordance with an example embodiment of the hybrid drive-thru door system, the guide system further includes a second guide track arranged on and extending in a plane parallel to an outer planar surface of the stationary door panel.

In accordance with an example embodiment of the hybrid drive-thru door system, the at least one intermediate guide roller assembly is operable to engage the second guide track in a manner that facilitates movement of the lower sliding door panel member along the second guide track.

In accordance with an example embodiment of the hybrid drive-thru door system, the at least one intermediate guide roller assembly comprises one or more second guide wheel members for rotation on the second guide track.

In accordance with an example embodiment of the hybrid drive-thru door system, the one or more second guide wheel members are mounted in a concealed position between the stationary door panel and the sliding door panel.

In accordance with an example embodiment of the hybrid drive-thru door system, the guide system further includes a third guide track arranged on and extending in a plane parallel to an outer planar surface of the stationary door panel.

In accordance with an example embodiment of the hybrid drive-thru door system, the at least one upper guide roller assembly is operable to engage the third guide track in a manner that facilitates movement of the upper sliding door panel member along the third guide track.

In accordance with an example embodiment of the hybrid drive-thru door system, the at least one upper guide roller assembly comprises one or more third guide wheel members for rotation on the third guide track.

In accordance with an example embodiment of the hybrid drive-thru door system, the one or more third guide wheel members are mounted in a concealed position between the stationary door panel and the sliding door panel.

In accordance with an example embodiment of the hybrid drive-thru door system, a clamp assembly is moveable between a clamped or locked operating state to attach the upper sliding door panel member to the lower sliding door panel member in the door operating mode, and an unclamped or unlocked operating state to unattach the upper sliding door panel member from the lower sliding door panel member in the window operating mode.

In accordance with an example embodiment of the hybrid drive-thru door system, the clamp assembly facilitates self-centering of the upper sliding door panel member and the lower sliding door panel member in a manner that achieves alignment of the upper sliding door panel member and the lower sliding door panel member when placed from the window operating mode to the door operating mode.

In accordance with an example embodiment of the hybrid drive-thru door system, a door sill member is arranged at a first interface between the upper sliding door panel member and the lower sliding door panel member.

In accordance with an example embodiment of the hybrid drive-thru door system, the upper sliding door panel member comprises a seal sub-assembly configured to form a seal at the interface.

In accordance with an example embodiment of the hybrid drive-thru door system, the seal sub-assembly comprises a first seal member and a second seal member. The first seal member is configured to form a seal at a second interface between the upper sliding door panel member and the door sill member at an exterior side of the door panel assembly. The second seal member is configured to form a seal, in the door operating mode of the sliding door panel, at a third interface between the upper sliding door panel member and the door sill member at an interior side of the door panel assembly.

In accordance with an example embodiment of the hybrid drive-thru door system, a clamp assembly is operable to releasably interlock the upper sliding door panel member and the lower sliding door panel member.

In accordance with an example embodiment of the hybrid drive-thru door system, the clamp assembly is selectively moveable between a clamped or locked operating state to secure the upper sliding door panel member and the lower sliding door panel member for joint movement in the door operating mode, and an unclamped or unlocked operating state to release the upper sliding door panel member from the lower sliding door panel member for independent movement of the upper sliding door panel member in the window operating mode.

In accordance with an example embodiment of the hybrid drive-thru door system, the clamp assembly comprises an upper clamp member, and a lower clamp member. The upper clamp member has one or more grooves, and is arranged on the upper sliding door panel member. The lower clamp member is arranged on the lower sliding door panel member, and has a clamp member that is pivotably moveable between a clamped position to place the clamp assembly in the clamped or locked operating state, and an unclamped position to place the clamp assembly in the unclamped or unlocked operating state.

In accordance with an example embodiment of the hybrid drive-thru door system, in the clamped position, the clamp member is rotated for engagement with the upper clamp member and receipt in the one or more grooves, and in the unclamped position, the clamp member is counter-rotated for disengagement with the upper clamp member and movement out of the one or more grooves.

In accordance with an example embodiment of the hybrid drive-thru door system, a safety system is provided and comprises: one or more safety light sources operable to emit an infrared beam from the door panel assembly in a horizontal direction across the doorway opening; and one or more safety sensors operable to dynamically detect when the infrared beam is traversed/breached.

In accordance with an example embodiment of the hybrid drive-thru door system, the one or more safety light sources include a first pair of safety light sources arranged adjacent to the upper sliding door panel member and a second pair of safety light sources arranged adjacent to the lower sliding door panel member.

In accordance with an example embodiment of the hybrid drive-thru door system, the one or more safety sensors include a first pair of safety sensors arranged adjacent to the upper sliding door panel member and a second pair of safety sensors arranged adjacent to the lower sliding door panel member.

In accordance with an example embodiment of the hybrid drive-thru door system, a control module is operatively connected to the safety light sources and the safety sensors. The control module comprises a non-transitory memory operatively coupled to one or more processors comprising a set of instructions executable by the one or more processors to cause: in response to a dynamic detection of a breach of the infrared beam in a closing movement of the sliding door panel in the door operating mode, automatic movement of the sliding door panel to the open position. The set of instructions are executable by the one or more processors to cause, in response to a dynamic detection of a breach of the infrared beam in a closing movement of the upper sliding door panel member in the window operating mode, automatic movement of the upper sliding door panel member to the open position.

In accordance with an example embodiment of the hybrid drive-thru door system, an activation system comprises: one or more activation light sources operable to emit an infrared beam from the door panel assembly in a horizontal direction across the doorway opening; and one or more activation sensors operable to dynamically detect when the infrared beam is traversed/breached.

In accordance with an example embodiment of the hybrid drive-thru door system, a control module is operatively connected to the activation light sources and the activation sensors. The control module comprises a non-transitory memory operatively coupled to one or more processors comprising a set of instructions executable by the one or more processors to cause: in response to a dynamic detection of a breach of the infrared beam in the closed position of the sliding door panel in the door operating mode, automatic movement of the sliding door panel to the open position. The set of instructions are executable by the one or more processors to cause, in response to a dynamic detection of a breach of the infrared beam in a closed position of the upper sliding door panel member in the window operating mode, automatic movement of the upper sliding door panel member to the open position.

DRAWINGS

The various advantages of the exemplary embodiments will become apparent to one skilled in the art by reading the following specification and appended claims, and by referencing the following drawings, in which:

Figure 1:
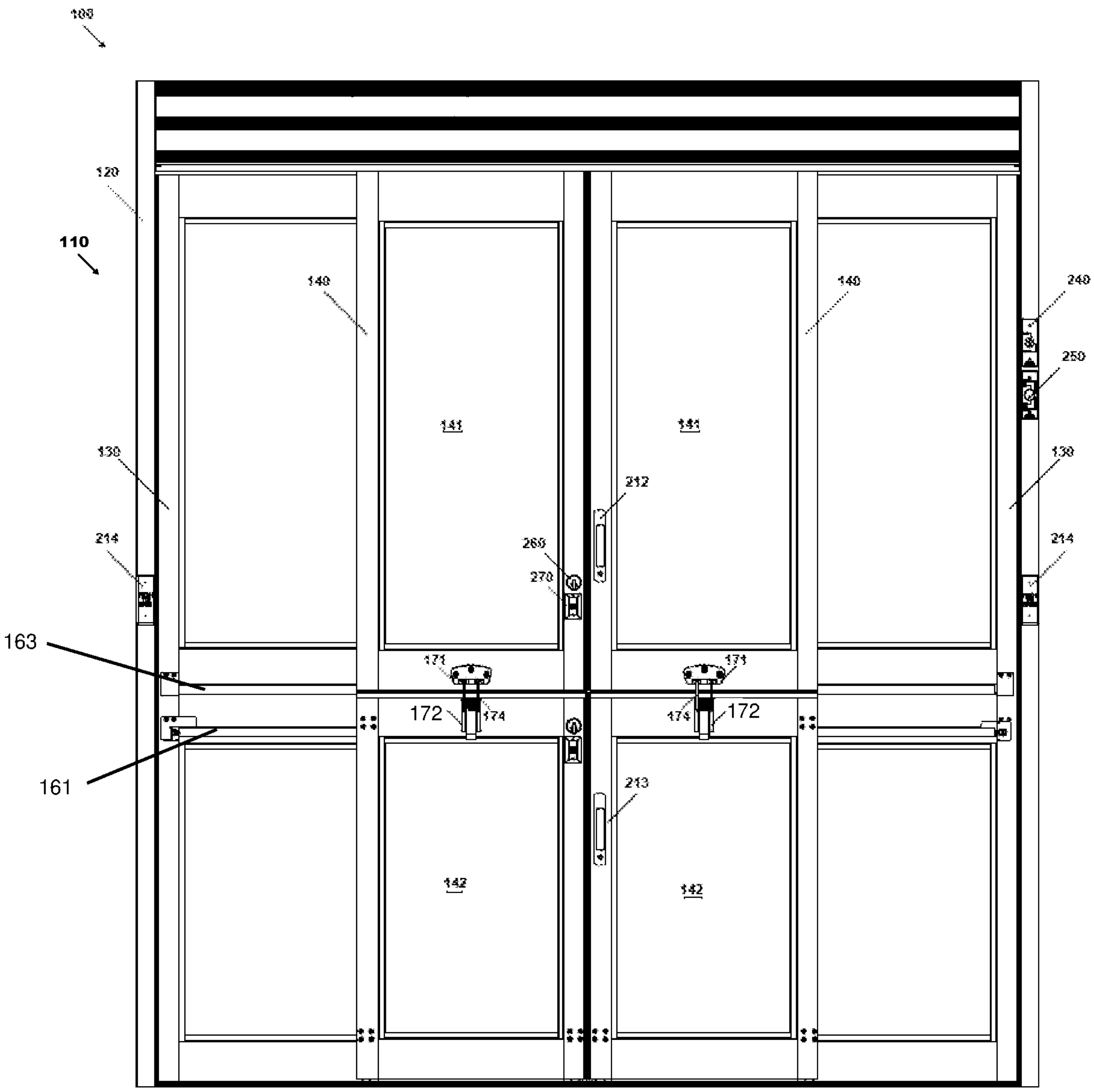
FIG. 1 illustrates a view of a hybrid automatic touchless door system from an interior side, in accordance with one or more embodiments.
Figure 4:
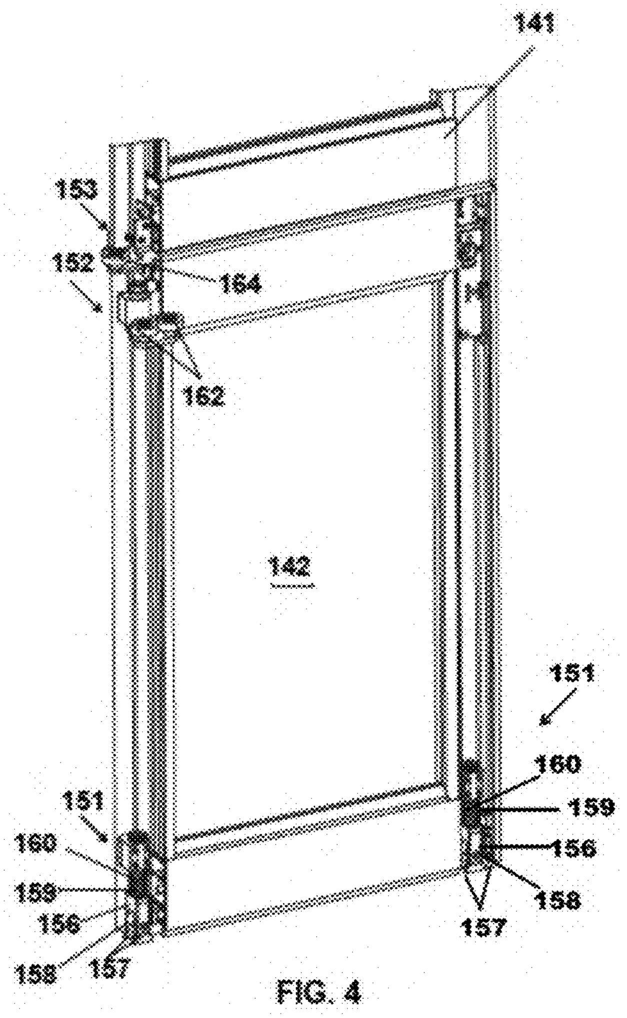
Figure 4A:
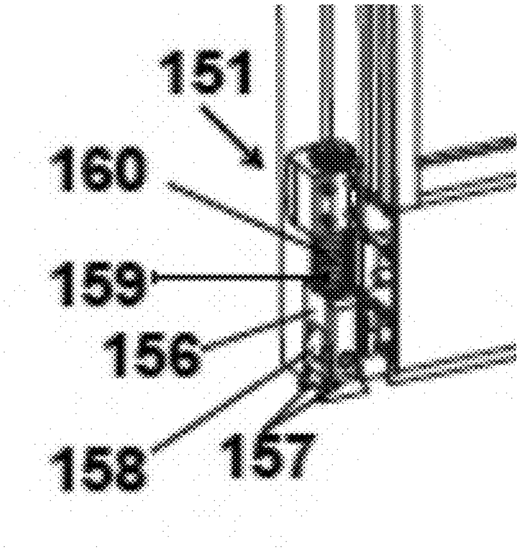

FIG. 4 illustrated a guide system for the lower sliding door panel member of the hybrid automatic touchless door system of FIG. 1, and FIG. 4A is enlarged view of a lower guide roller assembly of the lower sliding door panel member of FIG. 4.

Figure 5:
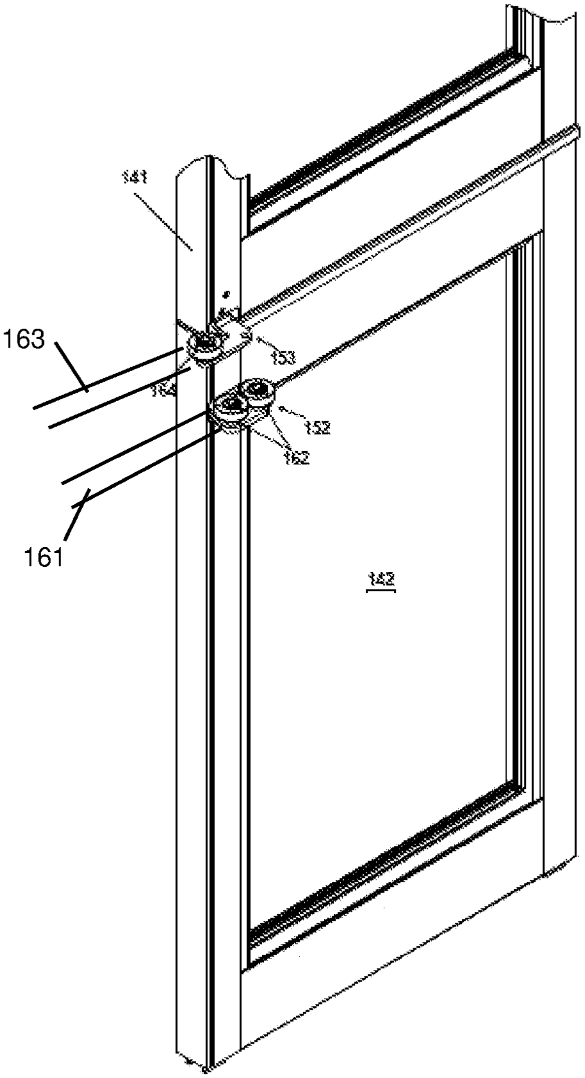

FIG. 5 illustrates an upper guide roller assembly and an intermediate guide roller assembly for the guide system of FIG. 4.

Figure 6:
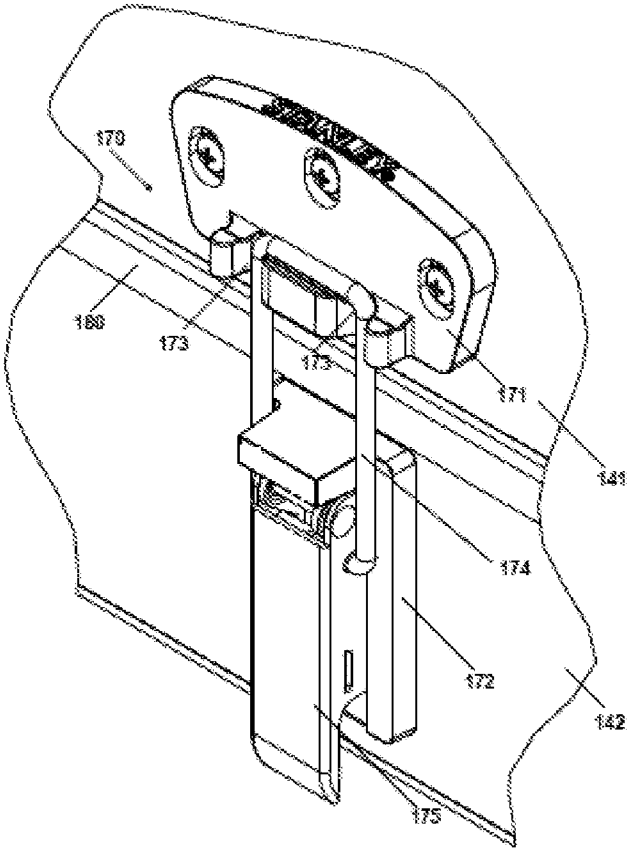

FIG. 6 illustrates a perspective view of a clamp assembly for the hybrid automatic touchless door system of FIG. 1.

Figure 7:
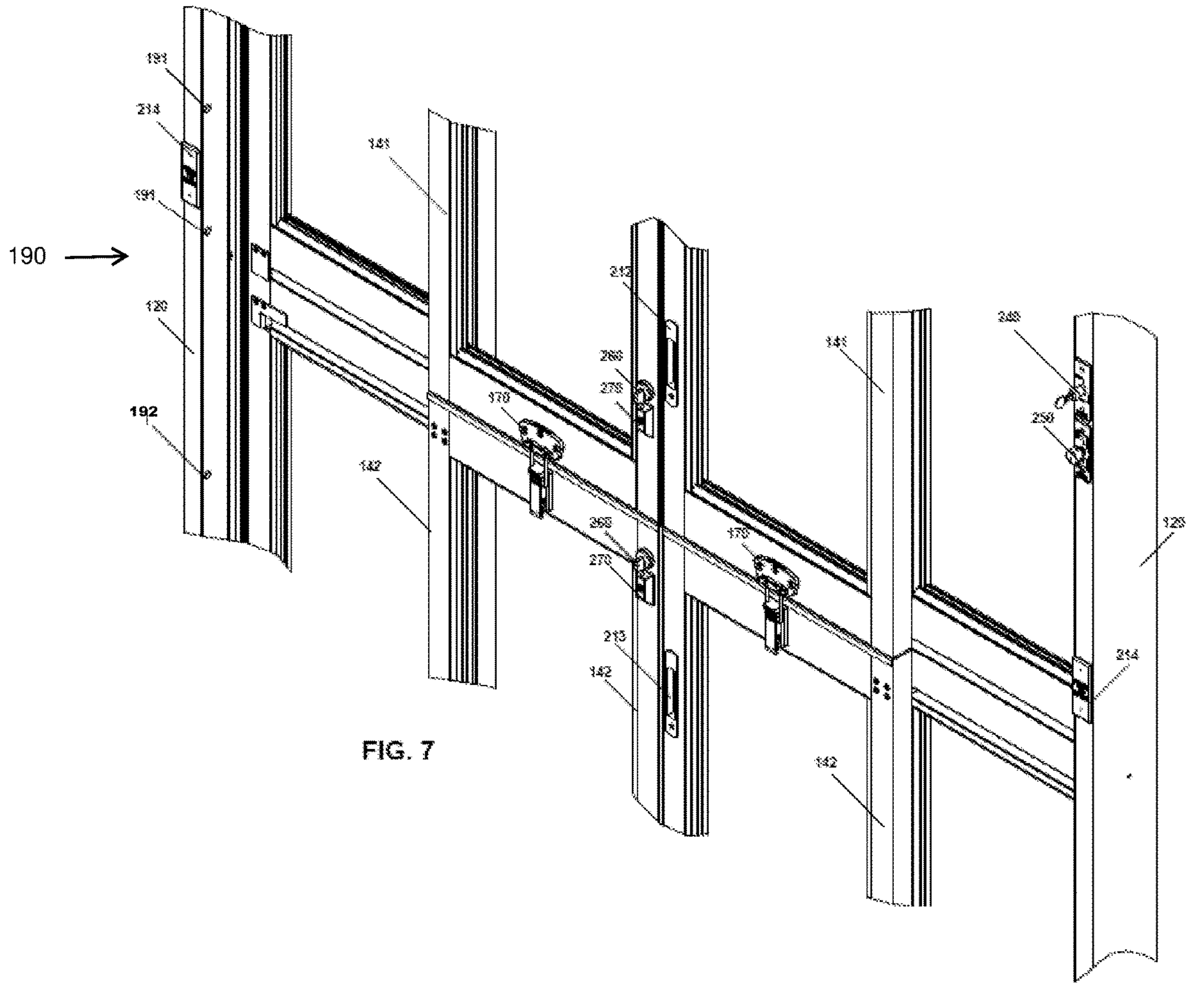

FIG. 7 illustrates the hybrid automatic touchless door system of FIG. 1 having an upper door panel members and lower door panel members being interlocked via the clamp assembly of FIG. 6.

Figure 8:
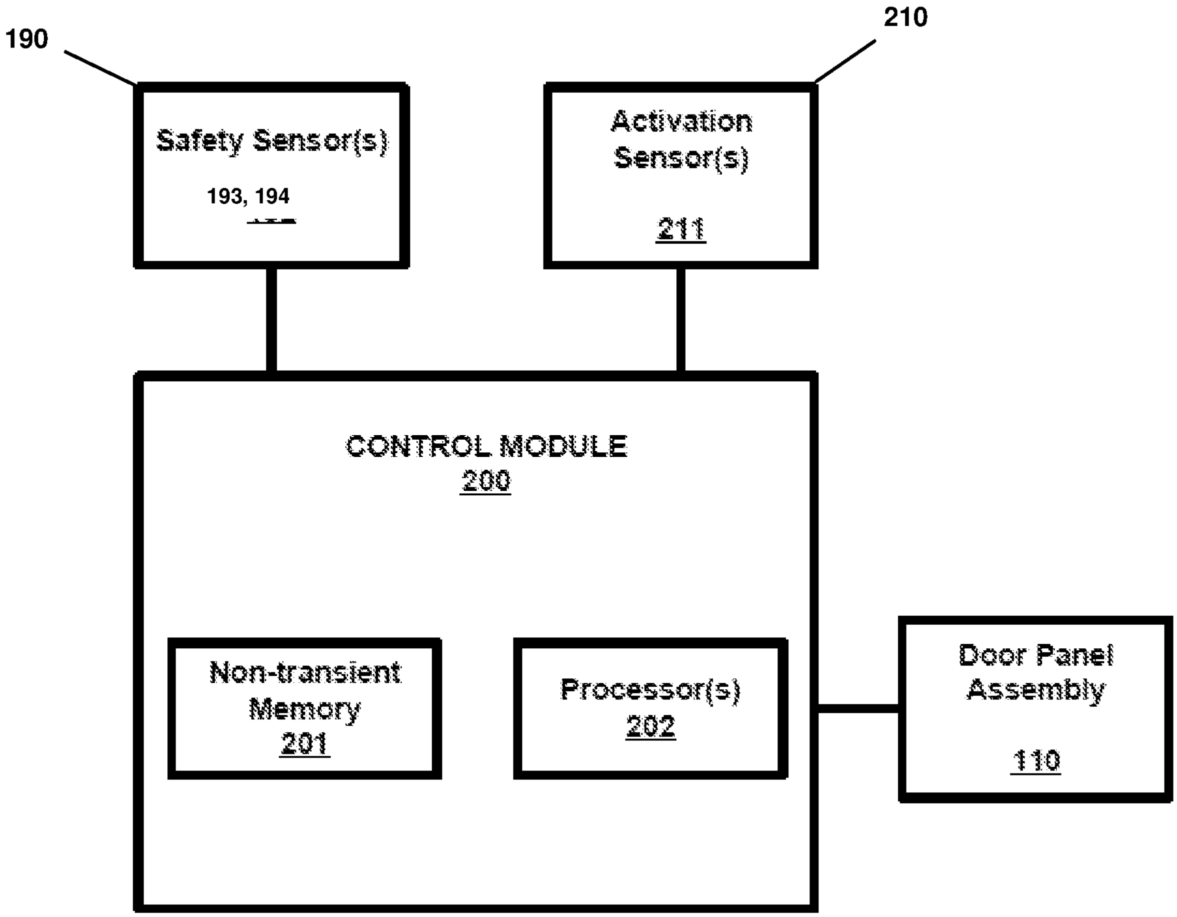

FIG. 8 illustrates a control module for the hybrid automatic touchless door system of FIG. 1.

Figure 9:
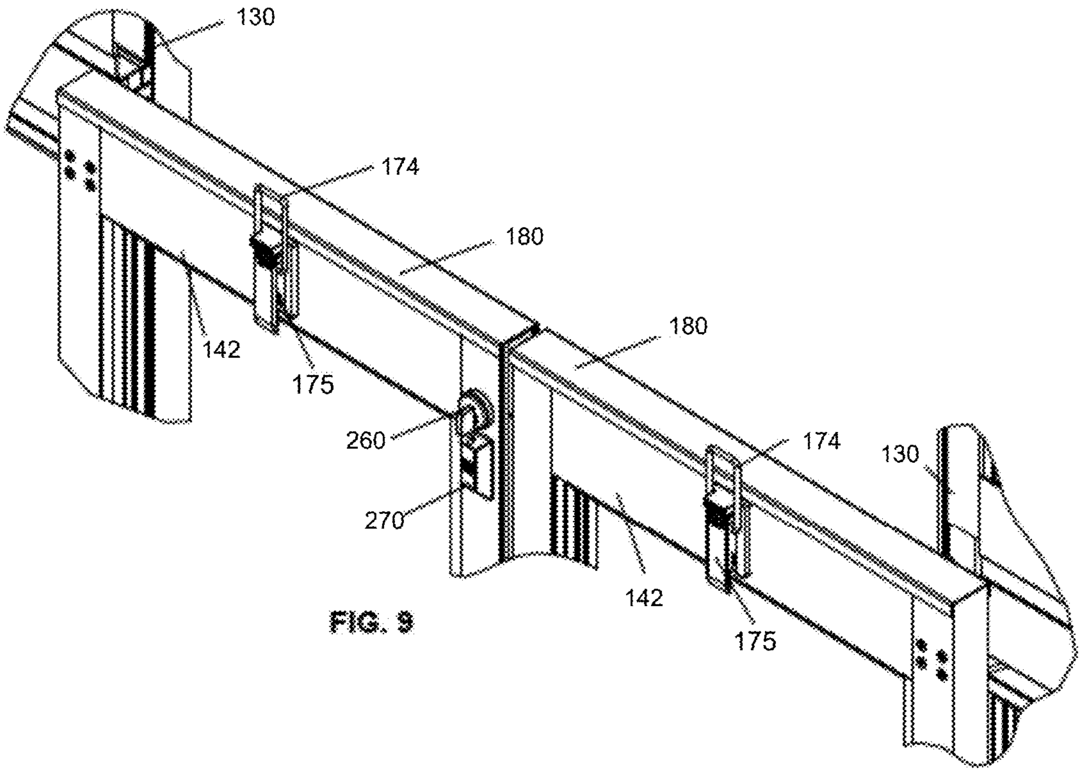

FIG. 9 illustrates a partial view of lower door panel members for the hybrid automatic touchless door system of FIG. 1, in an unclamped (i.e., unlocked operating state.

Figure 10:
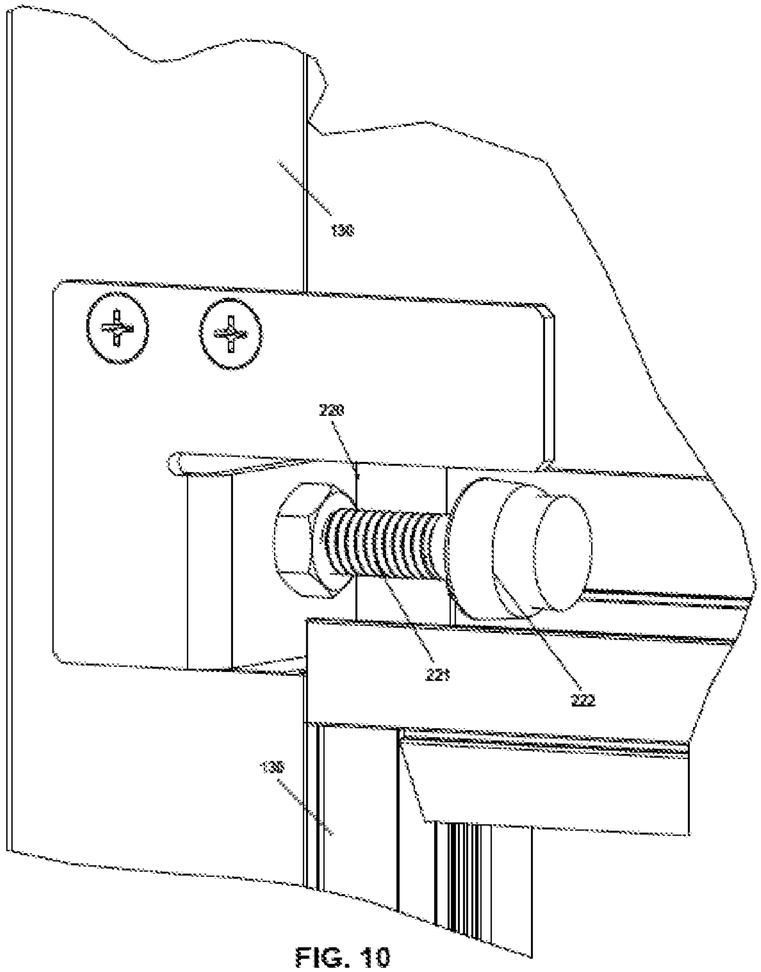

FIG. 10 illustrates a lower panel door bumper for the hybrid automatic touchless door system of FIG. 1.

Figure 11:
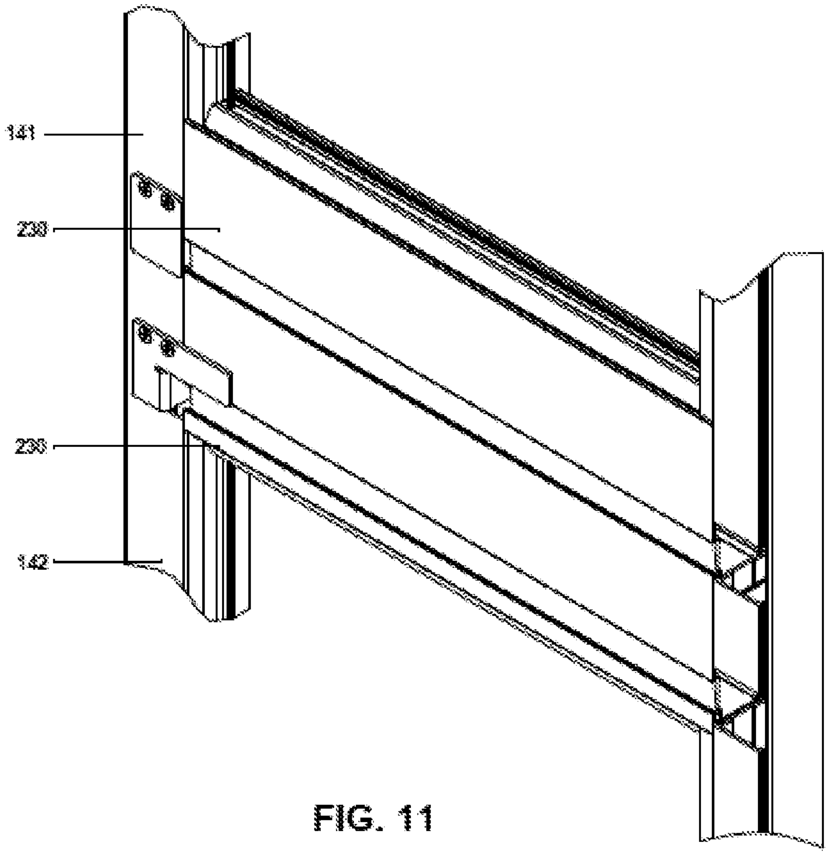

FIG. 11 illustrates pinch point guard members for the hybrid automatic touchless door system of FIG. 1.

Figure 12:
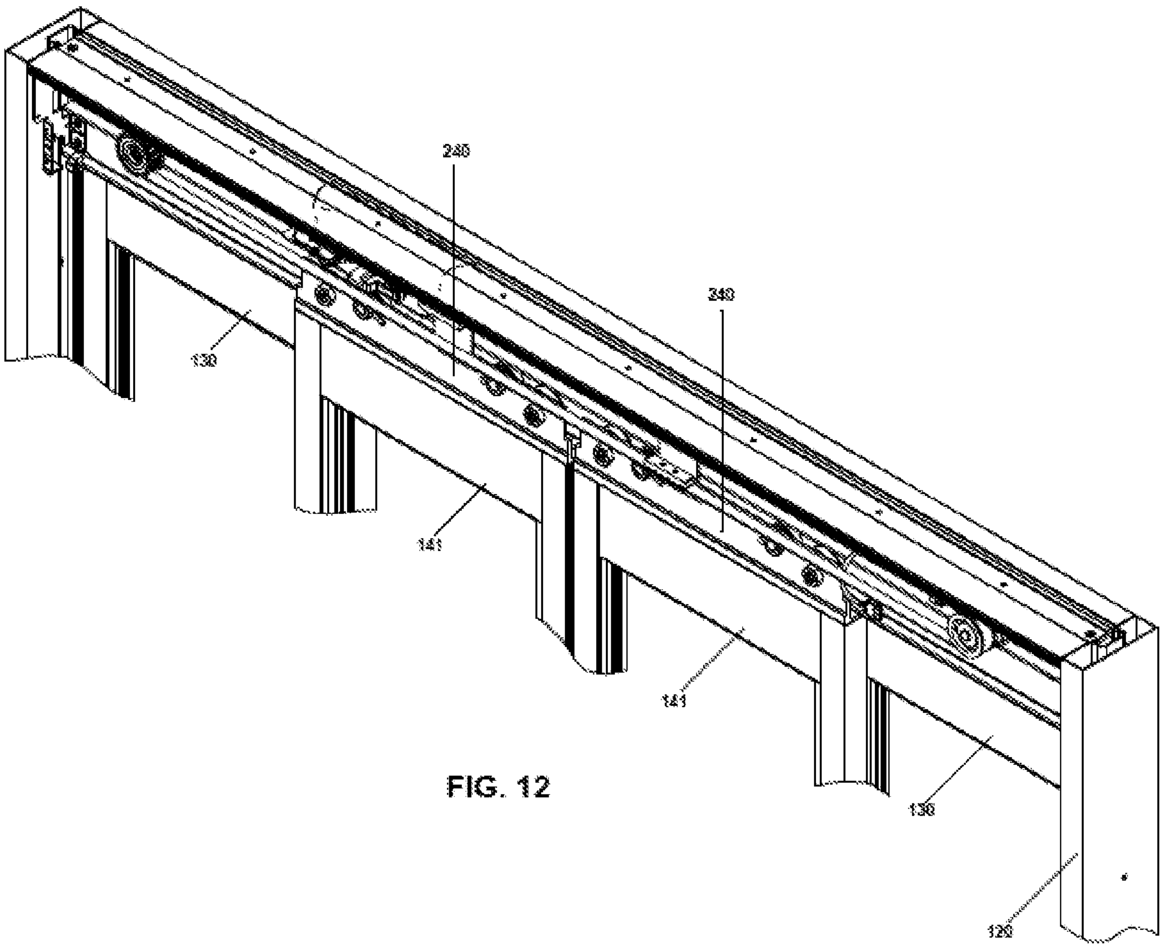

FIG. 12 illustrates utility hangers for door panels of the hybrid automatic touchless door system of FIG. 1.

Figure 13:
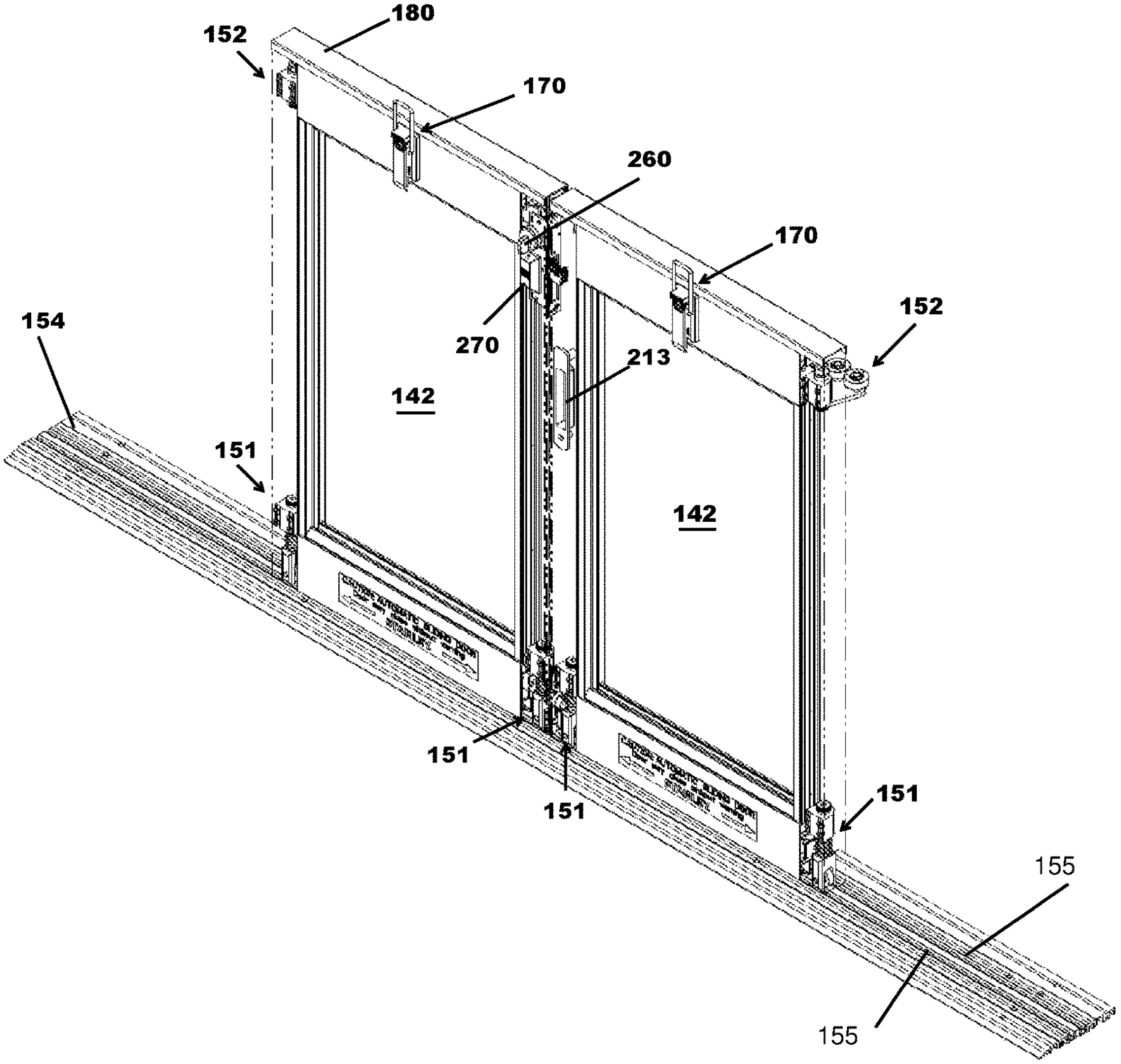

FIG. 13 illustrates the hybrid automatic touchless door system of FIG. 1 including a touchless activation system.

Figure 14:
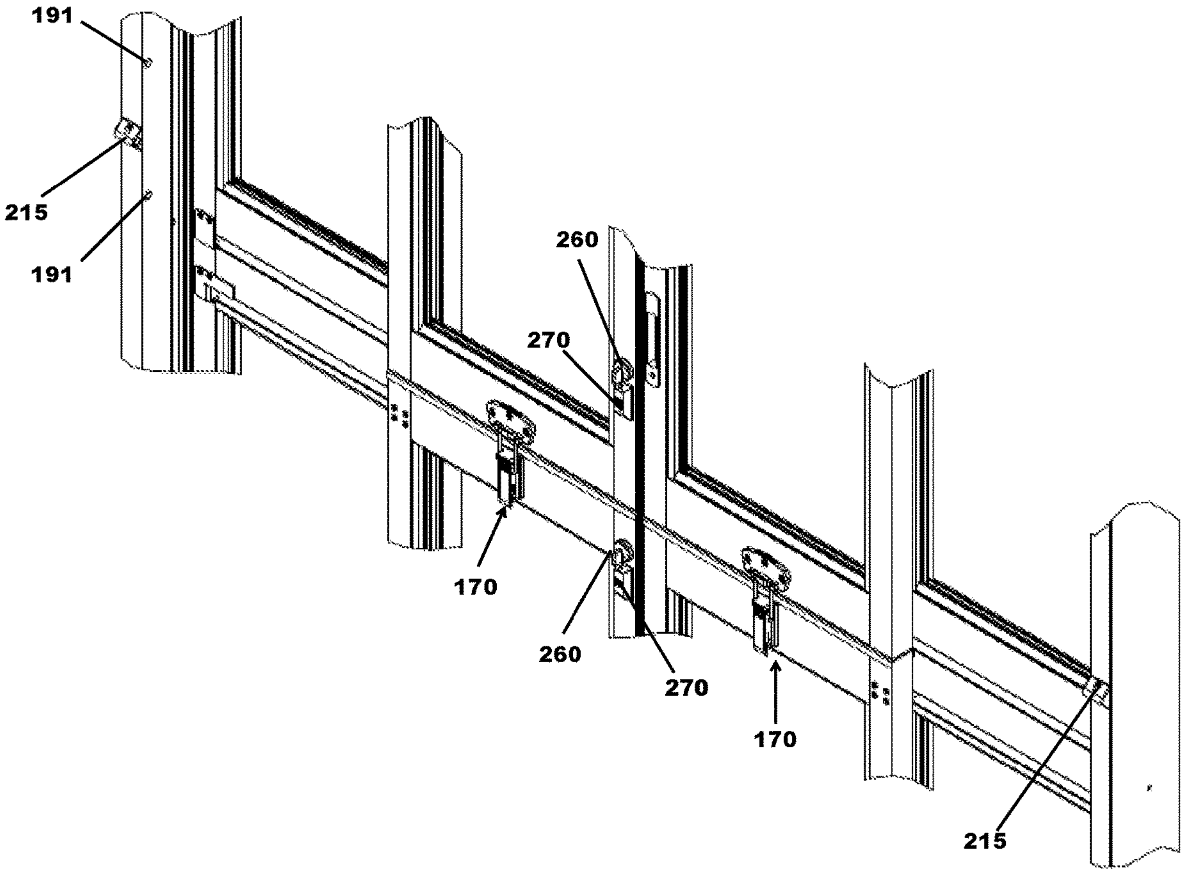

FIG. 14 illustrates the hybrid automatic touchless door system of FIG. 1 including touchless wave sensors.

DESCRIPTION

A detailed description of apparatuses, methods, and systems, consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Turning to the figures, in which FIG. 1 illustrates a hybrid automatic touchless door system 100, in accordance with one or more embodiments. The hybrid automatic touchless door system 100 has a structural configuration that combines the functionality of a drive-thru window with a fully automatic touchless door.

In accordance with one or more embodiments, the hybrid automatic touchless door system 100 is configured for mounting at a frame of a commercial business or retail business, such as, for example, a fast-food restaurants having drive-thru service. Embodiments, however, are not limited thereto, and thus, the hybrid automatic touchless door system 100 may have application in an industrial or residential setting or structure.

In accordance with one or more embodiments, an example hybrid drive-thru door system 100 includes a door panel assembly 110 operable for lateral movement with respect to a frame via a guide system. The hybrid drive-thru door system 100 may have a wired powered source, a wireless power source, a replaceable battery source, or a rechargeable battery source.

Figure 2:
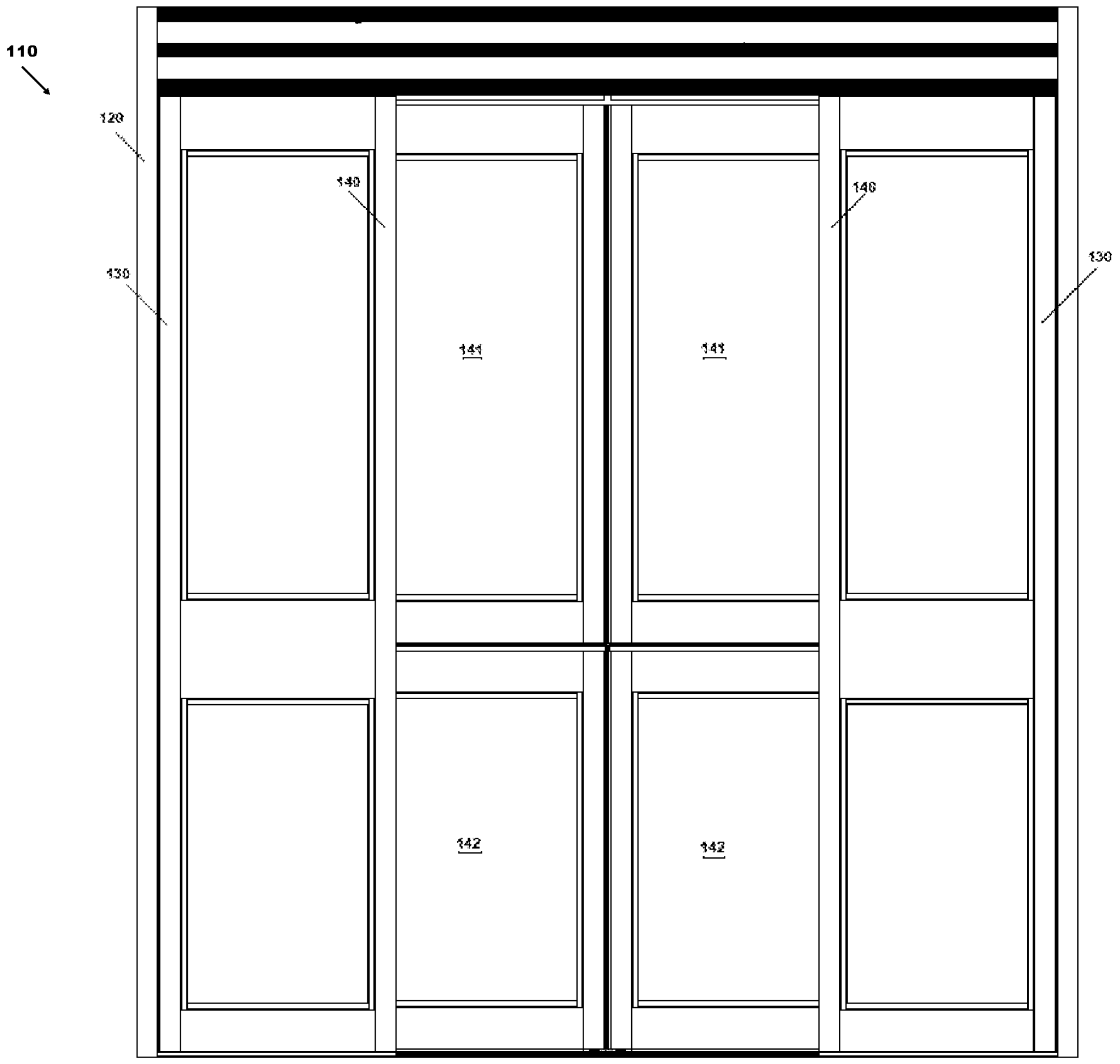
FIG. 2 illustrates a view of the hybrid automatic touchless door system of FIG. 1 from an exterior side.

As illustrated in FIGS. 1 and 2, the door panel assembly 110 is configured for mounting at the frame which defines a doorway opening. The door panel assembly 110 has a bifurcated structural configuration that includes a stationary door panel 130 and a sliding door panel 140 that is operable for automatic movement between a closed position to at least partially cover the doorway opening and an open position to at least partially expose the doorway opening.

The sliding door panel 140 has a bifurcated structural configuration that includes an upper sliding door panel member 141 and a lower sliding door panel member 142 that are split horizontally. The upper sliding door panel member 141 is releasably attached to the lower sliding door panel member 142 in a manner that facilitates selective placement of the sliding door panel 140 between a window operating mode and a door operating mode to permit ingress and egress of a user through the doorway opening. In the door operating mode, the upper sliding door panel member 141 and the lower sliding door panel member 142 are attached to each other, the attachment being released to place the sliding door panel 140 in the window operating mode.

As illustrated in FIGS. 4 and 5, the guide system has a structural configuration that provides stability and support of each sliding door panel 140 in the door panel assembly 110. The components of the guide system are concealed, and thus, not exposed to the ambient environment (e.g., dust particles, debris, rain, snow, etc.). This results in the performance of the guide system not being adversely affected by the ambient environment. The structural configuration of the guide system is also not prone to binding and facilitates vertical adjustment during movement of each sliding door panel 140. The guide system is operable to facilitate joint movement of the upper sliding door panel member 141 and the lower sliding door panel member 142 relative to the frame in the door operating mode. Such a structural configuration is also operable to facilitate independent movement of the upper sliding door panel member 141 relative to the lower sliding door panel member 142 in the window operating mode.

In accordance with one or more embodiments, the guide system includes a plurality of guide roller assemblies that include at least one lower guide roller assembly 151, at least one intermediate guide roller assembly 152, and at least one upper guide roller assembly 153. The structural configuration of each guide roller assembly 151, 152, 153 prevents the pivoting or swinging of the upper sliding door panel member 141 and the lower sliding door panel member 142.

The guide system further includes a plurality of guide tracks that include a first guide track 154 (FIG. 13), a second guide track 161, and a third guide track 163. The first guide track 154 has spaced apart guide channels 155 extending in parallel. The second guide track 161 is arranged on and extends in a plane parallel to an outer planar surface of the stationary door panel 130. The third guide track 163 is arranged on the stationary door panel 130, and is arranged on and extends in a plane parallel to an outer planar surface of the stationary door panel 130.

In the illustrated embodiment of FIG. 4 and FIG. 4A, the at least one lower guide roller assembly 151 is arranged at both lower corner regions of the lower sliding door panel member 142 to guide or otherwise facilitate movement of the lower sliding door panel member 142 in the door operating mode. In particular, the at least one lower guide roller assembly 151 is arranged in a concealed position in the lower sliding door panel member 142. In operation of the hybrid automatic touchless door system 100, the at least one lower guide roller assembly 151 is configured to engage the first guide track 154 and operable to facilitate movement of the lower sliding door panel member 142 along the first guide track 154 in the door operating mode.

The at least one lower guide roller assembly 151 includes a guide body 156 having a pair of spaced apart guide legs 157 configured for receipt in and operable for movement along the guide channels 155 to laterally stabilize the lower first door panel member 112 on the first guide track 154. The at least one lower guide roller assembly 151 also includes one or more first guide wheel members 158 connected to the guide body 156 for rotation on the first guide track 154. A bias member 159, such as, for example a spring, is mounted on a guide shaft 160 and is operable to apply a bias force to the guide body 156 in a manner that facilitates vertical adjustment of the lower sliding door panel member 142 during movement of the lower sliding door panel member 142 along the first guide track 154 while also maintaining the guide legs 157 in the guide channels 155. The first guide track 154 is sized so as to facilitate upward and downward movement of the one or more first guide wheel members 158 when the upper sliding door panel member 141 and the lower sliding door panel member 142 are attached together or unattached.

The at least one intermediate guide roller assembly 152 is arranged at an upper region of the lower sliding door panel member 142 to facilitate movement of the lower sliding door panel member 142 in the door operating mode. The at least one intermediate guide roller assembly 152 includes one or more second guide wheel members 162 for rotation on the second guide track 161 of the guide system. The one or more second guide wheel members 162 are mounted in a concealed position between the stationary door panel 130 and the sliding door panel 140. The at least one intermediate guide roller assembly 152 is configured to engage the second guide track 161 in an operable manner that facilitates movement of the lower sliding door panel member 142 along the second guide track 161.

The at least one upper guide roller assembly 153 is arranged at a lower region of the upper sliding door panel member 141 to facilitate movement of the upper sliding door panel member 141 in the door operating mode and the window operating mode. The at least one upper guide roller assembly 153 includes one or more third guide wheel members 164 operable for rotation on the third guide track 163. The one or more third guide wheel members 164 are mounted in a concealed position between the stationary door panel 130 and the sliding door panel 140. The at least one upper guide roller assembly 153 is configured to engage the third guide track 163 of the guide system in an operable manner that facilitates movement of the upper sliding door panel member 141 along the third guide track 163.

Figure 3:
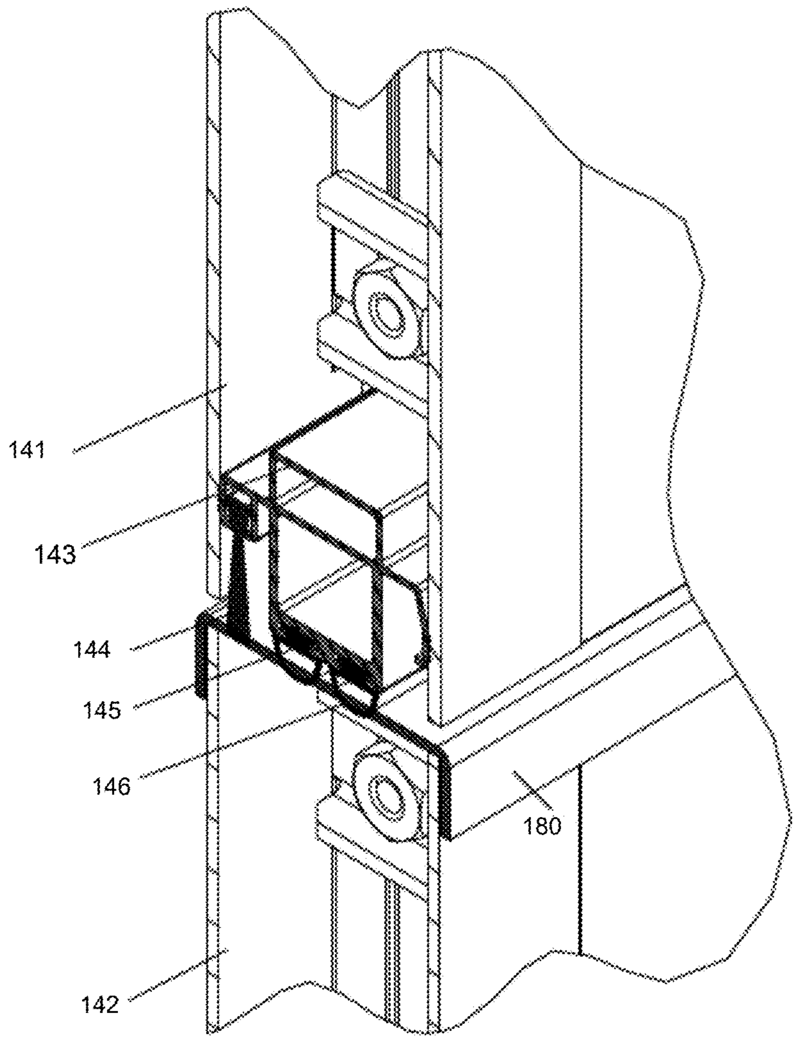
FIG. 3 illustrates a door panel sill seal assembly for the hybrid automatic touchless door system of FIG. 1.

The at least one intermediate guide roller assembly 152 is arranged at an upper region of the lower sliding door panel member 142 to facilitate movement of the lower sliding door panel member 142 in the door operating mode. The at least one intermediate guide roller assembly 152 includes one or more second guide wheel As illustrated in FIG. 3, a door panel seal assembly is provided for the hybrid automatic door system 100 to prevent entry of undesirable elements (e.g., debris, water, dirt, etc.) through a gap located between each upper sliding door panel member 141 and corresponding lower sliding door panel member 142. The gap facilitates unobstructed and frictionless movement of the upper first door panel member 141 when in the window operating mode.

The door panel seal assembly includes a seal carrier 143 which is received and recessed in an interior space of a sidewall of the upper sliding door panel member 141. A first seal member 144 extends longitudinally from the seal carrier 143 to form a seal at the gap at an exterior side of the door panel assembly 110. A pair of seal members that include a second seal member 145 and a third seal member 146 extend in parallel longitudinally from the seal carrier 143 to form seals at the gap at an interior side of the door panel assembly 110. The second seal member 145 and the third seal member 146 are spaced from the first seal member 144. The third seal member 146 is configured to form a seal, in the door operating mode of the sliding door panel 140, at an interface between the upper sliding door panel member 141 and the door sill member 180. The second seal member 145 and the third seal member 146 may respectively comprise a bulb-type seal. Embodiments, however, are not limited thereto, and thus, this disclosure contemplates the second seal member 145 and the third seal member 146 respectively comprising any suitable seal configuration in other embodiments.

As illustrated in FIGS. 6, 7, and 9 the hybrid drive-thru door system 100 further includes a clamp assembly 170 that is operable to releasably interlock the upper sliding door panel member 141 and the lower sliding door panel member 142 and thereby facilitate the selective placement of the sliding door panel 140 between the window operating mode and the door operating mode.

In accordance with one or more embodiments, the clamp assembly 170 includes an upper clamp body 171 and a lower clamp body 172 that provide a visual aid to the user to visually determine when the clamp assembly 171 is engaged or disengaged. The upper clamp body 171 is arranged on the upper sliding door panel member 141, whereas the lower clamp member 172 is arranged on the lower sliding door panel member 142. The upper clamp body 171 has one or more grooves 173, and the lower clamp body 172 has a pivotally-attached clamp member 174 that is pivotably moveable via an arm member 175 between a clamped position to place the clamp assembly 170 in a locked operating state, and an unclamped position to place the clamp assembly 170 in an unlocked state. In the clamped position, a user may pivot the clamp member 174 for engagement with the upper clamp member 171 and receipt in the grooves 173. In the unclamped position, the clamp member 174 is counter-pivoted for disengagement with the upper clamp member 171 and movement out of the one or more grooves 173. The structural configuration of the clamp assembly 170 facilitates self-centering of the upper sliding door panel member 141 and the lower sliding door panel member 142. Such self-centering serves to align the upper sliding door panel member 141 and the lower sliding door panel member 142 when placed from the window operating mode to the door operating mode.

In the door operating mode, a user may place the clamp assembly 170 in the clamped or locked operating state by selectively manipulating the arm member 175 so as to facilitate engagement of the clamp member 174 and the one or more grooves 173. Such engagement interlocks the upper sliding door panel member 141 and the lower sliding door panel member 142. In that way, the upper sliding door panel member 141 and the lower sliding door panel member 142 may move jointly.

In the window operating mode, a user may place the clamp assembly 170 in the unclamped or unlocked operating state by selectively manipulating the arm member 175 so as to facilitate disengagement of the clamp member 174 and the one or more grooves 173. Such disengagement releases the attachment of the upper sliding door panel member 141 and the lower sliding door panel member 142.

As illustrated in FIGS. 7 and 8, the hybrid drive-thru door system 100 also includes a safety system 190 that provides additional safety protection when each sliding door panel 140 is in placed in either the window operating mode or the door operating mode.

In accordance with one or more embodiments, the safety system 190 includes one or more safety light sources and one or more safety sensors. The one or more safety light sources are operable to emit a corresponding infrared holding beam from the door panel assembly 110 in a horizontal direction across the doorway opening. The one or more safety sensors are operable to dynamically detect when the infrared holding beam(s) is/are traversed/breached.

The one or more safety light sources include one or more upper safety light sources 191 and one or more lower safety light sources 192. The one or more upper safety light sources 191 are recessed into an upper sidewall region of the jamb 120 so as not to protrude therefrom. The one or more upper safety light sources 191 are operable to emit infrared holding beams in a horizontal direction across the doorway opening at the upper region of the door panel assembly 110, particularly, each upper first door panel member 141. The one or more lower safety light sources 192 are recessed into a lower sidewall region of the jamb 120 so as not to protrude therefrom. The one or more lower safety light sources 192 are operable to emit infrared holding beams from the door panel assembly 110 in a horizontal direction across the doorway opening at the lower region of the door panel assembly 110, particularly, each lower first door panel member 142.

The one or more safety sensors include one or more upper safety sensors 193 that correspond with the one or more upper safety light sources 191 and one or more lower safety sensors 194 that correspond with the one or more lower safety light sources 192. The one or more upper safety sensors 193 are operable to dynamically detect when the infrared holding beams emitted by the one or more upper safety sensors 193 are traversed/breached. The one or more lower safety sensors 194 are operable to dynamically detect when the infrared holding beams emitted by the one or more lower safety light sources 192 are traversed/breached. In accordance with one or more embodiments, the one or more safety sensors may work independently from each other, or alternatively, may work in combination with each other. The one or more safety sensors may be used in any combination, and may be used redundantly to validate and improve the accuracy of the detection.

The hybrid drive-thru door system 100 additionally includes an activation system 210 for a touchless activation (e.g., in an automated operating mode) of a corresponding sliding door panel 140 by a user from the closed position to the open position to at least partially expose the doorway opening and facilitate user ingress and egress through the doorway opening. The activation system 210 includes one or more activation sensors 211 mounted spatially above the door panel assembly 110 at an interface or boundary between each sliding door panel 140 when both are in the closed position. The one or more activation sensors 211 are operable to dynamically detect, determine, assess, monitor, measure, quantify, and/or sense a presence of a user who is approaching the door panel assembly 110 within a user-determined and/or predetermined threshold distance from a sliding door panel 140. Alternatively or additionally, one or more activation sensors 211 may be mounted spatially above the door panel assembly 110 to provide overhead sensing functionality.

In accordance with one or more embodiments, the one or more activation sensors 211 comprises one or more motion sensors, or one or more proximity sensors. Embodiments, however, are not limited thereto, and thus, this disclosure contemplates the one or more activation sensors 211 comprising any suitable sensor that sense a user presence. In accordance with one or more embodiments, the one or more activation sensors 211 may work independently from each other, or alternatively, may work in combination with each other. The one or more activation sensors 211 may be used in any combination, and may be used redundantly to validate and improve the accuracy of the detection.

In the illustrated embodiment of FIG. 14, alternatively or additionally, a user may automatically activate one or more touchless wave sensors 215 mounted on each jamb 120 to thereby cause activation of a corresponding sliding door panel 140 from the closed position to the open position to at least partially expose the doorway opening and facilitate user ingress and egress through the doorway. In accordance with one or more embodiments, the one or more one or more touchless wave sensors 215 may be used in conjunction with the one or more activation sensors 211. In accordance with one or more embodiments, the one or more touchless wave sensors 215 may work independently from each other, or alternatively, may work in combination with each other. The one or more touchless wave sensors 215 may be used in any combination, and may be used redundantly to validate and improve the accuracy of the detection.

As set forth, described, and/or illustrated herein, "sensor" means any device, component and/or system that can perform one or more of detecting, determining, assessing, monitoring, measuring, quantifying, and sensing something. The one or more sensors may be configured to detect, determine, assess, monitor, measure, quantify and/or sense in real-time. As set forth, described, and/or illustrated herein, "dynamically" or "real-time" means a level of processing responsiveness that a user or system senses as sufficiently immediate for a particular process or determination to be made, or that enables the processor to keep up with some external process.

In the manual operating mode, particularly for use when there is a lack of power, a user may manually engage an upper grab handle 212 and a lower grab handle 213 such as shown in FIG. 7 to cause movement of the upper sliding door panel member 141 and the lower sliding door panel member 142 from the closed position to the open position to at least partially expose the doorway opening and facilitate user ingress and egress through the doorway opening.

In the illustrated embodiment of FIGS. 1 and 7, alternatively or additionally, a user may engage one or more manual push plates 214 (to receive power from a power source) mounted on each jamb 120 in order to cause activation of a corresponding sliding door panel 140 from the closed position to the open position to at least partially expose the doorway opening and facilitate user ingress and egress through the doorway opening. In accordance with one or more embodiments, the one or more one or more manual push plates 214 may be used in conjunction with the one or more activation sensors 211 and the one or more touchless wave sensors 215.

For added security, the hybrid drive-thru door system 100 includes a power switch 240 and a rotary function switch 250. Adjacent upper sliding door panel members 141 may be interlocked together and adjacent lower sliding door panel members 142 may be interlocked together manually to a closed position via a manual key switch 260. A visual indicator 270 may visually indicate the status (locked or unlocked). A power switch, a rotary function switch, and a manual key switch for the hybrid automatic touchless door system of FIG. 1.

As illustrated in FIG. 8, a control module 200 is operatively connected to the one or more safety sensors 193, 194 and the one or more activation sensors 211. The control module 200 comprises a non-transitory memory 201 operatively coupled to one or more processors 202 comprising a set of instructions executable by the one or more processors 202 to cause the one or more processors 202 to execute one or more one or more instructions to control various operational systems, subsystems, and components of the hybrid drive-thru door system 100. In accordance with one or more embodiments set forth, described, and/or illustrated herein, “processor” means any component or group of components that are configured to execute any of the processes described herein or any form of instructions to carry out such processes or cause such processes to be performed. The one or more processors 202 may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 202 may comprise at least one hardware circuit (e.g., an integrated circuit) configured to carry out one or more instructions contained in program code. In embodiments in which there is a plurality of processors 202, such processors 202 may work independently from each other, or one or more processors 202 in the plurality may work in combination with each other. In one or more embodiments, the one or more processors 202 may be a host, main, or primary processor of the hybrid drive-thru door system 100.

In accordance with one or more embodiments, the one or more processors 202, in response to a dynamic detection by the one or more safety sensors 193, 194 of a breach of the infrared holding beam in a closing movement of a sliding door panel 140 in the door operating mode, may cause automatic movement of each sliding door panel 140 to the open position to expose the doorway opening and thereby facilitate user ingress and egress therethrough.

In accordance with one or more embodiments, the one or more processors 202, in response to a dynamic detection by the one or more safety sensors 193, 194 of a breach of the infrared beam in a closing movement of the upper sliding door panel member 141 in the window operating mode, automatic movement of each upper sliding door panel member 141 to the open position.

In accordance with one or more embodiments, the one or more processors 202, in response to a dynamic detection by the activation sensors 211 of a presence of a user within the user-determined predetermined threshold distance in the door operating mode, may cause an automatic movement of each sliding door panel 140 to the open position to expose the doorway opening and thereby facilitate user ingress and egress therethrough.

In accordance with one or more embodiments, the one or more processors 202, in response to a dynamic detection by the activation sensors 211 of a user within the user-determined predetermined threshold distance in the window operating mode, may cause automatic movement of each upper sliding door panel member 141 to the open position.

As illustrated in FIG. 10, the hybrid drive-thru door system 100 also includes a lower panel door bumper stop 220 mounted at the stationary door panel 130. The lower panel door bumper stop 220 includes a longitudinal arm member 221 and a bumper stop member 222 that is configured, in a door operating mode, to engage the sidewall surface of the lower sliding door panel member 142 and thereby stop movement of the sliding door panel 140 and prevent over travel of lower sliding door panel member 142. The lower panel door bumper stop 220 is configured, in the window operating mode, to provide additional support for the lower sliding door panel member 142. The lower panel door bumper stop 220 is also selectively adjustable in a manner which selectively limits the travel distance of the lower sliding door panel member 142.

As illustrated in FIG. 11, the hybrid drive-thru door system 100 also includes a plurality of pinch point guard members 230 having brushes. The pinch point guard members 230 are located between the upper sliding door panel member 141 and the lower sliding door panel member 142 and configured to prevent injury to a hand (i.e., fingers) of user that may become accidentally trapped, pinched, or crushed between door gaps or at gaps between the guide system.

As illustrated in FIG. 12, the hybrid drive-thru door system 100 also includes a utility hanger member 240 mounted on each upper sliding door panel member 141 and operable to slide upper sliding door panel member 141 in a horizontal direction to provide dual functionality to the upper sliding door panel member 141 and the lower sliding door panel member 142.

As used herein, the terms “coupled,” “attached,” or “connected” may refer to any type of relationship, direct or indirect, between the components in question, and may apply to electrical, mechanical, fluid, optical, electromagnetic, electro-mechanical or other connections. Additionally, the terms “first,” “second,” etc. are used herein only to facilitate discussion, and carry no particular temporal or chronological significance unless otherwise indicated. The terms “cause” or “causing” means to make, force, compel, direct, command, instruct, and/or enable an event or action to occur or at least be in a state where such event or action may occur, either in a direct or indirect manner.

As used herein, the terms "substantially," "generally," "slightly" and other words of degree are relative modifiers intended to indicate permissible variation from the characteristic so modified. It is not intended to be limited to the absolute value or characteristic which it modifies but rather possessing more of the physical or functional characteristic than its opposite, and approaching or approximating such a physical or functional characteristic.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A hybrid drive-thru door system, comprising:

a door panel assembly configured for mounting at a frame defining a doorway opening, the door panel assembly including a stationary door panel and a sliding door panel operable for automatic movement relative to the stationary door panel and the frame between a closed position cover the doorway opening and an open position to expose the doorway opening, the sliding door panel including a bifurcated configuration that is split horizontally into an upper sliding door panel member and a lower sliding door panel member that both cover the doorway opening in the closed position, wherein the upper sliding door panel is hung at a top of the frame so that a gap is formed between a lower end of the upper sliding door panel member and an upper end of the lower sliding door panel member, the upper sliding door panel member releasably interlocked with the lower sliding door panel member in a manner that facilitates selective placement of the sliding door panel between a window operating mode in which the lower sliding door panel member occupies the doorway opening and a door operating mode to permit user ingress and egress through the doorway opening that was covered by both the upper and lower sliding door panel members so that jointly moving the interlocked upper and lower sliding door panel members exposes without obstruction the doorway opening from the top of the frame to a bottom of the frame, wherein the gap between the lower end of the upper sliding door panel member and the upper end of the lower sliding door panel member provides for unobstructed movement of the upper sliding door panel member relative to the lower sliding door panel member in the window operating mode;

a door panel seal assembly including a seal carrier engaged to the upper sliding door panel member, the seal carrier of the door panel seal assembly including a first seal member extending from the seal carrier to form a first seal at the gap along the interface at an exterior side of the door panel assembly, the door panel seal assembly further including a second seal member extending from the seal carrier to form a second seal at the gap at an interior side of the door panel assembly at the interface of the upper sliding door panel member with the lower sliding door panel member; and a guide system configured for joint movement of the interlocked upper sliding door panel member and the lower sliding door panel member relative to the frame and the stationary door panel in the door operating mode, and independent movement of the upper sliding door panel member relative to the lower sliding door panel member and the stationary door panel in the window operating mode, the guide system including:

at least one lower guide roller assembly arranged at a lower region of the lower sliding door panel member to facilitate movement of the lower sliding door panel member along the frame in the door operating mode, at least one intermediate guide roller assembly including a pair of rollers arranged at an upper region of the lower sliding door panel member to facilitate movement of the lower sliding door panel member along a first guide track on the stationary door panel in the door operating mode, and at least one upper guide roller assembly including a roller arranged at a lower region of the upper sliding door panel member to facilitate movement of the upper sliding door panel member along a second guide track on the stationary door panel in the door operating mode and the window operating mode.

2. The hybrid drive-thru door system of claim 1, wherein:

the guide system further includes the first guide track having spaced apart guide channels extending in parallel, and the at least one lower guide roller assembly is configured to engage the first guide track and facilitate movement of the lower sliding door panel member along the first guide track in the door operating mode.

3. The hybrid drive-thru door system of claim 2, wherein the at least one lower guide roller assembly is arranged in a concealed position in the lower sliding door panel member and comprises:

a guide body having a pair of spaced apart guide legs configured to be received in the guide channels to laterally stabilize the lower sliding door panel member on the first guide track, one or more first guide wheel members connected to the guide body for rotation on the first guide track, and a bias member mounted on a guide shaft operable to apply a bias force to the guide body in a manner that facilitates vertical adjustment of the lower sliding door panel member during movement of the lower sliding door panel member along the first guide track while also maintaining the guide legs in the guide channels as the guide legs are moved along the guide channels.

4. The hybrid drive-thru door system of claim 2, wherein:

the guide system further includes the second guide track arranged on and extending in a plane parallel to an outer planar surface of the stationary door panel, and the at least one intermediate guide roller assembly is operable to engage the second guide track in a manner that facilitates movement of the lower sliding door panel member along the second guide track.

5. The hybrid drive-thru door system of claim 4, wherein the at least one intermediate guide roller assembly comprises one or more second guide wheel members for rotation on the second guide track.

6. The hybrid drive-thru door system of claim 5, wherein the one or more second guide wheel members are mounted in a concealed position between the stationary door panel and the sliding door panel.

7. The hybrid drive-thru door system of claim 4, wherein:

the guide system further includes a third guide track arranged on and extending in a plane parallel to an outer planar surface of the stationary door panel, and the at least one upper guide roller assembly is operable to engage the third guide track in a manner that facilitates movement of the upper sliding door panel member along the third guide track.

8. The hybrid drive-thru door system of claim 7, wherein the at least one upper guide roller assembly comprises one or more third guide wheel members for rotation on the third guide track.

9. The hybrid drive-thru door system of claim 8, wherein the one or more third guide wheel members are mounted in a concealed position between the stationary door panel and the sliding door panel.

10. The hybrid drive-thru door system of claim 1, further comprising a clamp assembly operable to releasably interlock the upper sliding door panel member and the lower sliding door panel member.

11. The hybrid drive-thru door system of claim 10, wherein the clamp assembly is selectively moveable between a locked state to secure the upper sliding door panel member and the lower sliding door panel member for joint movement in the door operating mode, and an unlocked state to release the upper sliding door panel member from the lower sliding door panel member for independent movement of the upper sliding door panel member in the window operating mode.

12. The hybrid drive-thru door system of claim 11, wherein the clamp assembly comprises:

an upper clamp member arranged on the upper sliding door panel member, the upper clamp member having one or more grooves; and a lower clamp member arranged on the lower sliding door panel member, the lower clamp member having a clamp member that is pivotably moveable between a clamped position to place the clamp assembly in the locked state, and an unclamped position to place the clamp assembly in the unlocked state.

13. The hybrid drive-thru door system of claim 12, wherein:

in the clamped position, the clamp member is pivoted for engagement with the upper clamp member and receipt in the one or more grooves, and in the unclamped position, the clamp member is counter-pivoted for disengagement with the upper clamp member and movement out of the one or more grooves.

14. A hybrid drive-thru door system, comprising:

a door panel assembly configured for mounting at a frame defining a doorway opening, the door panel assembly including a stationary door panel and a sliding door panel operable for movement along the stationary door panel and the frame between a closed position to cover the doorway opening and an opened position to expose the doorway opening, the sliding door panel including a bifurcated configuration that is split horizontally into an upper sliding door panel member releasably interlocked with a lower sliding door panel member that both cover the doorway opening in the closed position, wherein the upper sliding door panel is hung at a top of the frame so that a gap is formed between a lower end of the upper sliding door panel member and an upper end of the lower sliding door panel member;

a guide system configured to facilitate joint movement of the upper sliding door panel member and the lower sliding door panel member along the stationary door panel in a door operating mode to permit user ingress and egress through the doorway opening that was covered by both the upper and lower sliding door panel members so that jointly moving the interlocked upper and lower sliding door panel members to the opened position exposes without obstruction the doorway opening from the top of the frame to a bottom of the frame, and independent movement of the upper sliding door panel member relative to the lower sliding door panel member and the stationary door panel in a window operating mode of the sliding door panel in which the lower sliding door panel member occupies the doorway opening, wherein the gap between the lower end of the upper sliding door panel member and upper end of the lower sliding door panel member provides unobstructed movement of the upper sliding door panel member relative to the lower sliding door panel member in the window operating mode, the guide system including:

at least one lower guide roller assembly arranged at a lower region of the lower sliding door panel member to facilitate movement of the lower sliding door panel member in the door operating mode, at least one intermediate guide roller assembly including a pair of rollers arranged at an upper region of the lower sliding door panel member to facilitate movement of the lower sliding door panel member along a first guide track on the stationary door panel in the door operating mode, and at least one upper guide roller assembly including a roller arranged at a lower region of the upper sliding door panel member to facilitate movement of the upper sliding door panel member along a second guide track on the stationary door panel in the door operating mode and the window operating mode; and a door panel seal assembly including a seal carrier engaged to the upper sliding door panel member, the seal carrier of the door panel seal assembly including a first seal member extending from the seal carrier to form a first seal at the gap along the interface at an exterior side of the door panel assembly, the door panel seal assembly further including a second seal member extending from the seal carrier to form a second seal at the gap at an interior side of the door panel assembly at the interface of the upper sliding door panel member with the lower sliding door panel member.

15. The hybrid drive-thru door system of claim 14, wherein:

the guide system further includes the first guide track having spaced apart guide channels extending in parallel, and the at least one lower guide roller assembly is operable to engage the first guide track and facilitate movement of the lower sliding door panel member along the first guide track in the door operating mode.

16. The hybrid drive-thru door system of claim 15, wherein the at least one lower guide roller assembly is arranged in a concealed position in the lower sliding door panel member and comprises:

a guide body having a pair of spaced apart guide legs movably received in the guide channels to laterally stabilize the lower sliding door panel member on the first guide track, one or more first guide wheel members connected to the guide body for rotation on the first guide track, and a bias member mounted on a guide shaft operable to apply a bias force to the guide body in a manner that facilitates vertical adjustment of the lower sliding door panel member during movement of the lower sliding door panel member along the first guide track while also maintaining the guide legs in the guide channels.

17. The hybrid drive-thru door system of claim 14, further comprising a clamp assembly operable to releasably interlock the upper sliding door panel member and the lower sliding door panel member, the clamp assembly being selectively moveable between a locked state to secure the upper sliding door panel member and the lower sliding door panel member for joint movement in the door operating mode, and an unlocked state to release the upper sliding door panel member from the lower sliding door panel member for independent movement of the upper sliding door panel member in the window operating mode.

18. The hybrid drive-thru door system of claim 17, wherein the clamp assembly comprises:

an upper clamp member arranged on the upper sliding door panel member, the upper clamp member having one or more grooves;

a lower clamp member arranged on the lower sliding door panel member, the lower clamp member having a clamp member that is pivotably moveable between a clamped position to place the clamp assembly in the locked state, and an unclamped position to place the clamp assembly in the unlocked state; and an indicator member located on an outer surface of the sliding door panel to visually indicate a status of the clamp assembly.

19. The hybrid drive-thru door system of claim 18, wherein:

in the clamped position, the clamp member is rotated for engagement with the upper clamp member and receipt in the one or more grooves, and in the unclamped position, the clamp member is counter-pivoted for disengagement with the upper clamp member and movement out of the one or more grooves.

20. A hybrid drive-thru door system, comprising:

a door panel assembly configured for mounting at a frame defining a doorway opening, the door panel assembly including a stationary door panel and a sliding door panel operable for movement relative to the frame and the stationary door panel between a closed position to cover the doorway opening and an opened position to expose the doorway opening, the sliding door panel including a bifurcated configuration that is split horizontally into an upper sliding door panel member and a lower sliding door panel member that both cover the doorway opening in the closed position, wherein the upper sliding door panel is hung at a top of the frame so that a gap is formed between a lower end of the upper sliding door panel member and an upper end of the lower sliding door panel member, the upper sliding door panel member releasably interlocked with the lower sliding door panel member and movable along the frame relative to the stationary door panel and the lower sliding door panel member when released, wherein there is the gap between the lower end of the upper sliding door panel member and the upper end of the lower sliding door panel member provides unobstructed movement of the upper sliding door panel member relative to the lower sliding door panel member when released;

a door panel seal assembly including a seal carrier engaged to the upper sliding door panel member, the seal carrier of the door panel seal assembly including a first seal member extending from the seal carrier to form a first seal at the gap along the interface at an exterior side of the door panel assembly, the door panel seal assembly further including a second seal member extending from the seal carrier to form a second seal at the gap at an interior side of the door panel assembly at the interface of the upper sliding door panel member with the lower sliding door panel member; and a guide system including a plurality of guide roller assemblies to facilitate joint movement of the upper sliding door panel member and the lower sliding door panel member relative to the stationary door panel to permit user ingress and egress through the doorway opening that was covered by both the upper and lower sliding door panel members so that jointly moving the interlocked upper and lower sliding door panel members to the opened position exposes without obstruction the doorway opening from the top of the frame to a bottom of the frame in a door operating mode, and at least one of the plurality of roller guide assemblies facilitating independent movement of the upper sliding door panel member relative to the lower sliding door panel member and the stationary door panel along a first guide track on the stationary door panel in a window operating mode of the sliding door panel in which the lower sliding door panel member occupies the doorway opening.

* * * * *